P. E. LAMBERT.
NEEDLE-THREADER.
No. 170,278.            Patented Nov. 23, 1875.
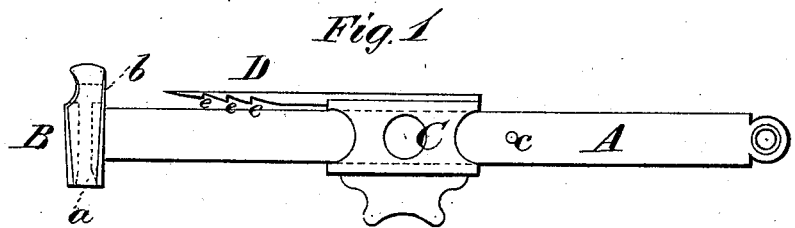
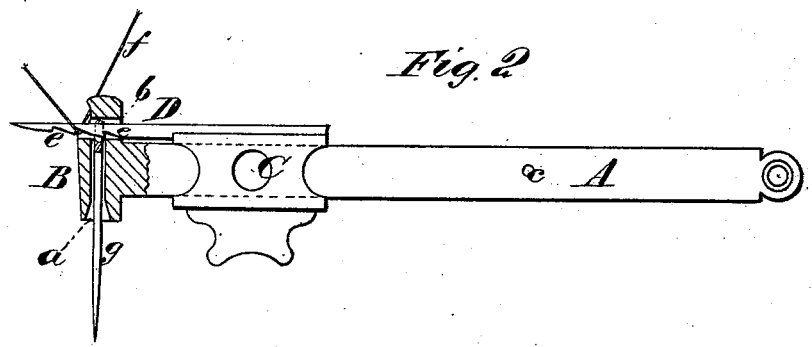
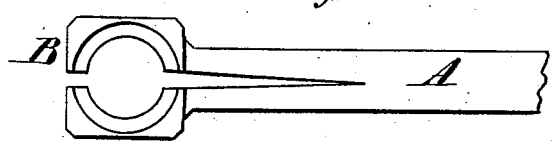
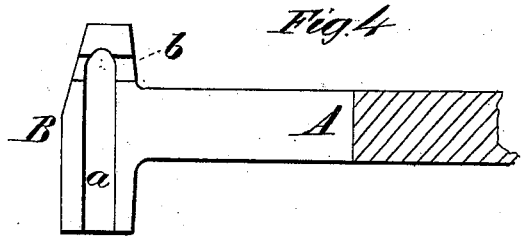
WITNESSES,  
Eug. M. Johnson  
E. H. Bates  
INVENTOR  
Peter E. Lambert,  
Chipman & —— & Co  
ATTORNEYS

UNITED STATES PATENT OFFICE.

PETER E. LAMBERT, OF NEW ORLEANS, LOUISIANA.

IMPROVEMENT IN NEEDLE-THREADERS.

Specification forming part of Letters Patent No. 170,278, dated November 23, 1875; application filed April 17, 1875.

*To all whom it may concern:*

Be it known that I, PETER E. LAMBERT, of New Orleans, in the parish of Orleans and State of Louisiana, have invented a new and valuable Improvement in Needle-Threaders; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side view of my needle-threader, and Fig. 2 is a side view, part sectional, of the same; Figs. 3 and 4 are detail views.

This invention has relation to devices which are designed to facilitate the threading of needles; and the nature of my invention and improvement consists in the combination of a barbed spear, which is allowed to slide on a shank, with a perforated socket for receiving the eye end of a needle, as will be understood from the following description.

In the annexed drawings, A designates the straight shank of my improved needle-threader, on one end of which a socket-piece, B, is formed, having two holes, *a b*, through it at right angles to each other. The hole or socket *a* is at right angles to the shank A, and is designed to receive the head of a needle, as shown in Fig. 2, and the hole *b*, which is at right angles to the socket *a*, is designed to receive through it a spear, D, which spear is barbed at *e*, and rigidly secured to a slide, C. The slide C is movable on the shank A, and its movement is limited by a stop-pin, *c*.

If desired, the socket-piece B may be split, as shown in Figs. 3 and 4, for the purpose of adapting it to receive needles of different sizes.

The manner of threading a needle, with my improved device, is as follows: The head of the needle is inserted into the socket *a*, and adjusted so that the eye of the needle is in line with the hole *b*. The slide C is then moved up, and the barbed spear D inserted through the eye of the needle; the thread is then passed around one of the barbs *e*, and the spear is drawn back, carrying with it the thread through the eye of the needle.

What I claim as new, and desire to secure by Letters Patent, is—

A needle-threader, composed of the shank A, provided with the stop *c* and perforated socket portion B, having elastic jaws, in combination with the slide C, having the barbed spear D, substantially as and for the purpose set forth.

In testimony that I claim the above I have hereunto subscribed my name in the presence of two witnesses.

PETER ERNEST LAMBERT.

Witnesses:
 CHARLES RHODES,
 J. PARIS AINDRESS.